United States Patent [19]

Salle

[11] Patent Number: 4,965,786
[45] Date of Patent: Oct. 23, 1990

[54] ECHO CANCELLER FOR A VARIABLE-PHASE ECHO SIGNAL

[75] Inventor: Bertrand Salle, Paris, France

[73] Assignee: Telecommunications Radio-electronics et Telephoniques T.R.T., Paris, France

[21] Appl. No.: 327,225

[22] Filed: Mar. 22, 1989

[30] Foreign Application Priority Data

Mar. 25, 1988 [FR] France ................................ 88 03938

[51] Int. Cl.⁵ ............................................. H04B 3/23
[52] U.S. Cl. .................................. 370/32.1; 379/411
[58] Field of Search ................ 370/32, 32.1; 479/411, 479/410, 406

[56] References Cited

U.S. PATENT DOCUMENTS 4,072,830  2/1978  Gitlin et al. ........................ 379/411
4,682,358  7/1987  Werner ............................... 379/411

FOREIGN PATENT DOCUMENTS 0270706  6/1988  European Pat. Off. ............ 379/411
2479617 10/1981  France .
2164529  3/1986  United Kingdom ............... 370/32.1

OTHER PUBLICATIONS

CCITT Recommendation V. 32.

*Primary Examiner*—Jin F. Ng
*Assistant Examiner*—Randall S. Vaas
*Attorney, Agent, or Firm*—Anne E. Barschall

[57] ABSTRACT

An echo canceller for cancelling a variable-phase echo signal is connected between two one-way send and receive paths coupled by means of a coupling circuit (6) to a two-way path. This echo canceller comprises an adaptive filter (92) cooperating with a phase shifter (95) for forming a replica of the echo signal, and a subtractor (72) inserted in the receive path for producing a difference signal between the echo signal and its replica. This canceller further comprises a suppressing circuit for suppressing a d.c. component (300) of the difference signal, which circuit is designed for supplying an adjusting quantity in the direction of the adaptive filter and the phase sifter.

15 Claims, 6 Drawing Sheets

ECHO CANCELLER FOR A VARIABLE-PHASE ECHO SIGNAL The present invention relates to an echo canceller for cancelling a variable phase echo signal, connected between two one-way send and receive paths coupled with a two-way path by means of a coupling circuit, this echo canceller comprising an adaptive filter cooperating with a phase-shifting means for forming a replica of the echo signal, and a subtractor inserted in the receive path for supplying a difference signal between the echo signal and its replica.

The echo cancellers find important applications. An echo canceller can be used in a transceiver arrangement, for example, a modem whose one-way send and receive paths, together forming a four-wire circuit, are often coupled by means of a coupling circuit, called hybrid junction, so that the arrangement has a two-wire access to the exterior. It is known that when a connection is established between two transceiver arrangements by means of their two-wire accesses, it may happen that a fraction of the signal sent over the send path of the same arrangement returns inadvertently in the receive path of the arrangement as a result of imperfections of the hybrid junctions or as a result of signal reflections in the connection. An echo canceller has for its object to cancel automatically this unwanted signal or echo signal which appears in the receive path. The advantage of this echo cancelling operation is that it allows for a simultaneous transmission between two transceiver arrangements connected by their two-wire accesses. These transceiver arrangements (modems) are used for data transmission.

A variable phase echo signal results, for example, from a frequency offset which may occur, when in the connection between two transceiver arrangements a section is included in which the transmission is effected by two carrier current systems operating for the two respective directions of transmission. If the frequencies used for the modulation and demodulation in each carrier current system are not exactly the same, a signal sent over the send path of a transceiver arrangement may produce in the receive path of this arrangement an echo signal which, having been conveyed through the carrier current systems, has a frequency different from that of the sent signal and thus has a time-varying phase.

An echo canceller for cancelling a variable phase echo signal is described in French Patent Application No. 2 479 617 (European Patent Application EP-A-0 036 696) in the name of the Applicants. Although it has operated satisfactorily to date, it has proved that this echo canceller had to be improved specifically with respect to the precision at which the phase shift can be tracked and its effectiveness in the case of echo signals that have a low level. Thus, such an improved canceller fulfils the new requirements of high-speed interconnection which have since been made on data transmission units.

The present invention has for its object to provide an echo canceller of the type described above presenting a performance that is superior to prior-art cancellers.

According to a first feature of the invention, an echo canceller is characterized in that it comprises a suppressing circuit for suppressing the d.c. component of the difference signal, which circuit is intended to supply an adjusting quantity in the direction of the adaptive filter and the phase shifting means and which operates by means of adaptive computation.

This first feature provides not only the advantage of creating a better performing echo canceller, but also facilitating, by means of the adjusting quantity thus obtained, the convergence speed of a linear echo canceller, the linear echo canceller being often associated with the echo cancellers for cancelling a variable phase echo signal.

According to a second feature of the invention, an echo canceller for cancelling a variable phase echo signal in which canceller, at the instant $t+1$, a phase estimating means forms a phase value $\phi(t+1)$ on the basis of a previous value $\phi(t)$ and a phase deviation $\Delta\phi(t)$ is characterized in that the phase shifting means comprises an integrating circuit for carrying out an integration $\Delta\bar{\phi}(t)$ of the phase deviation $\Delta\phi(t)$.

With these two features, the echo canceller for cancelling a variable phase echo signal presents a good performance for rapidly cancelling, from the moment it is switched on, the variable phase echo signal while complying with the procedures of the CCITT Recommendation V.32.

The following description accompanied by the annexed drawings, all this given by way of non-limiting example, will make it better understood how the invention can be realized, in which drawings.

Figure 1:
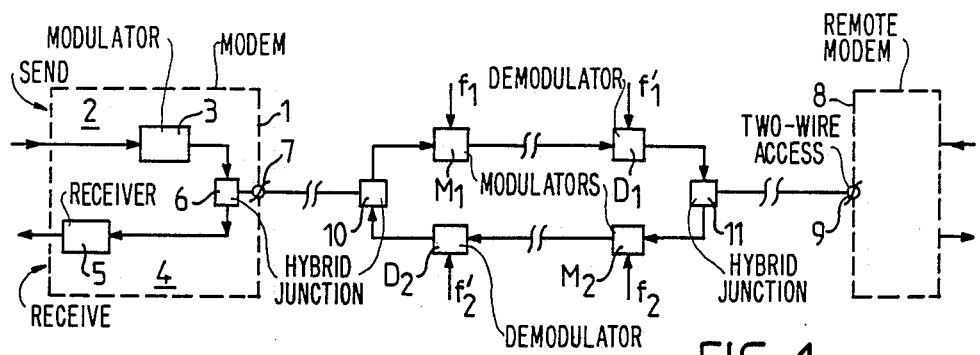
FIG. 1 is a diagram of a transmission system producing a variable phase echo signal.

FIG. 1 shows by way of example the block diagram of a data transmission system which can give rise to a variable phase echo signal. A modem 1 comprises a send path 2 which includes a modulator 3 that receives data from a terminal (not shown) and a receive path 4 which includes a receiver 5 that supplies data to this terminal. The output of the modulator 3 and the input of the receiver 5 are coupled by means of a hybrid junction 6 (or coupling circuit) with a two-wire access of the modem represented by the terminal 7. A remote modem 8 comprises the same elements (not shown) and also includes a two-wire access represented by the terminal 9. When a connection is established between these two modems 1 and 8, a fraction of the signal sent over the send path 2 may occur in the receive path 4 of the modem 1 as a result of imperfections of the hybrid junction 6 and/or signal reflections in the connection; this unwanted signal called echo signal has the same frequency as the transmitted signal when the connection between the two modems is established entirely over a single two-wire transmission line. In this case, this echo signal has an invariable phase and is called linear echo signal. But, in many cases, when the distance between the modems is large, we will find in the line a four-wire transmission section using carrier current systems. As shown in the figure, this section comprises at its ends two hybrid junctions 10 and 11 to change from a two-wire to a four-wire connection. At the ends of the path in one direction of transmission, there is a modulator $M_1$ and a demodulator $D_1$ using the carrier frequencies $f_1$ and $f'_1$ respectively. At the ends of the path in the other direction of transmission, there is a modulator $M_2$ and a demodulator $D_2$ using the carrier frequencies $f_2$ and $f'_2$ respectively. When the modulator 3 of the modem 1 is transmitting, an echo signal may occur in its receive path 4, which signal is caused by imperfections of the hybrid junction 11 and has passed through the carrier current system $M_1$, $D_1$ in one direction and the carrier current system $M_2$, $D_2$ in the other direction. If the frequencies $f_1$, $f'_1$ and $f_2$, $f'_2$ are such that $(f'_1-f_1)+(f'_2-f_2)=0$, the echo signal has the same frequency as that of the signal transmitted by the modulator 3, and one has to do with an invariable phase or fixed phase linear echo signal. If, on the other hand, the frequencies $f_1$, $f'_1$ and $f_2$, $f'_2$ are such that $(f'_1-f_1)+(f'_2-f_2)\neq 0$, the echo signal is affected by a frequency offset of, for example, several Hz, and its phase is variable in time. The echo canceller according to the invention is an arrangement which can be included in the modem 1 to cancel such a variable phase signal which occurs in the receive path 4. It is assumed hereinafter that in this receive path 4 a linear echo signal is equivalent to a variable phase signal that has a constant phase equal to zero.

Figure 2:
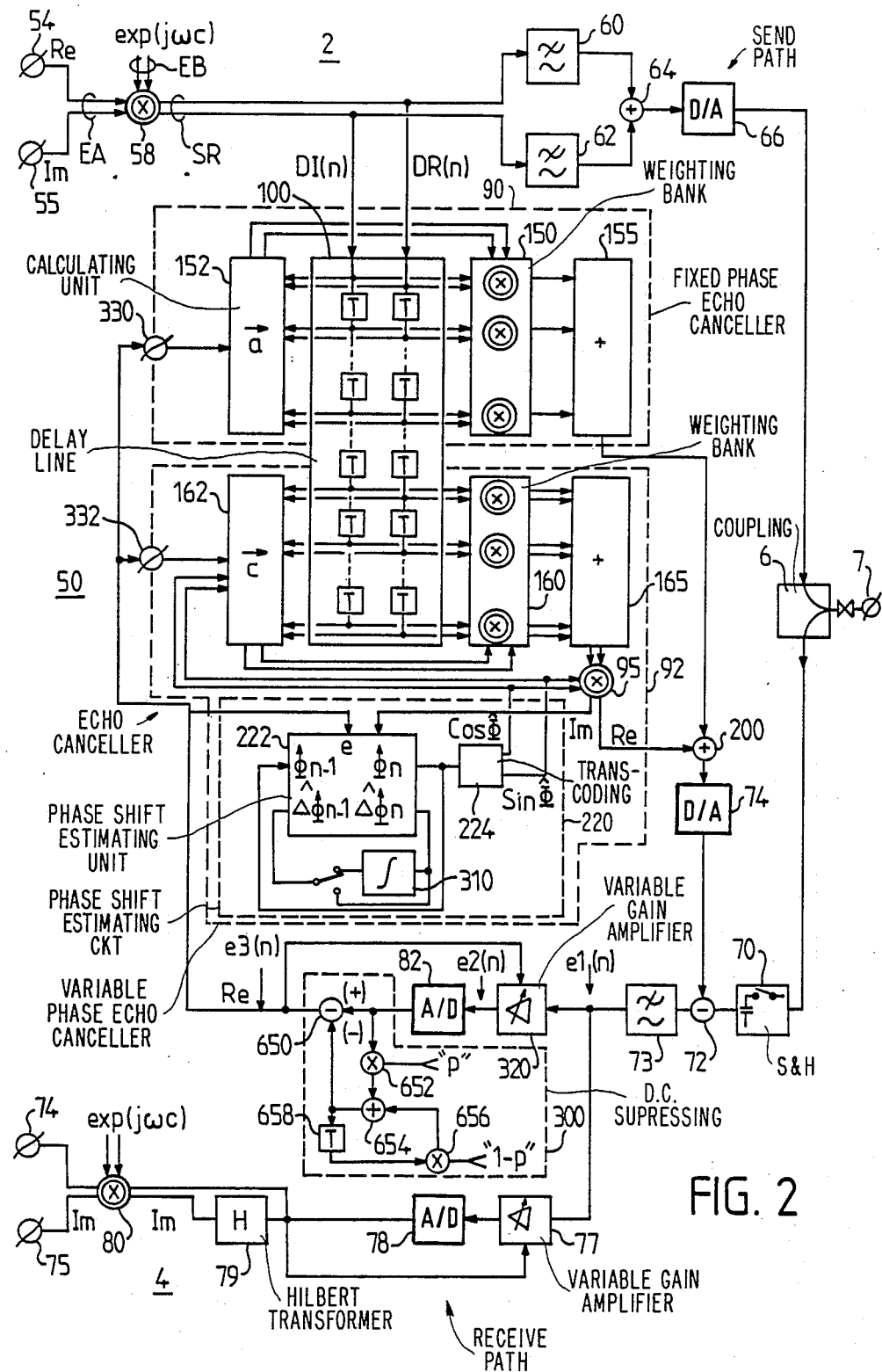
FIG. 2 is a diagram of an echo canceller for a variable phase echo signal, in combination with an echo canceller for a fixed phase echo signal, in accordance with the invention.

In FIG. 2 is represented an echo canceller 50 according to the invention. This echo canceller will be described within the framework of the CCITT Recommendation V.32. This echo canceller is connected between the send path 2 and the receive path 4 in a modem 1. The terminals 54 and 55 receive data in a complex, digital form. Terminal 54 receives the real portion Re of the data.

Figure 3A:
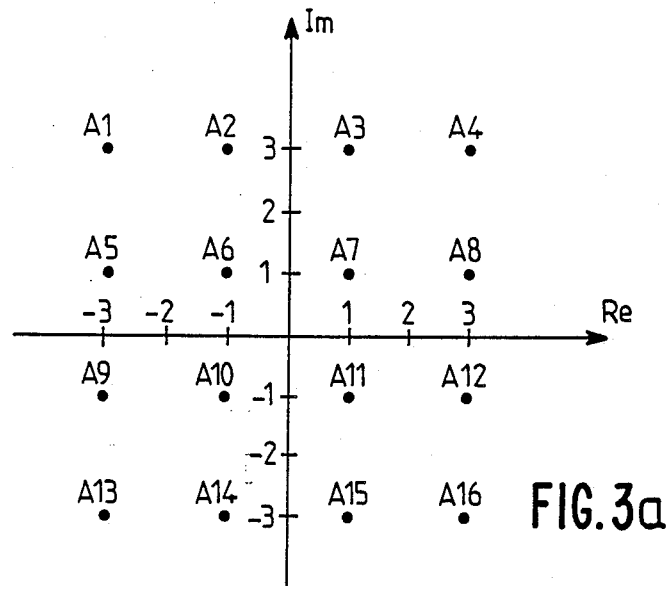
FIG. 3a shows a first signal constellation in the complex plane of data processed by the echo canceller according to the invention and FIG. 3b shows another possible signal constellation.
Figure 3B:
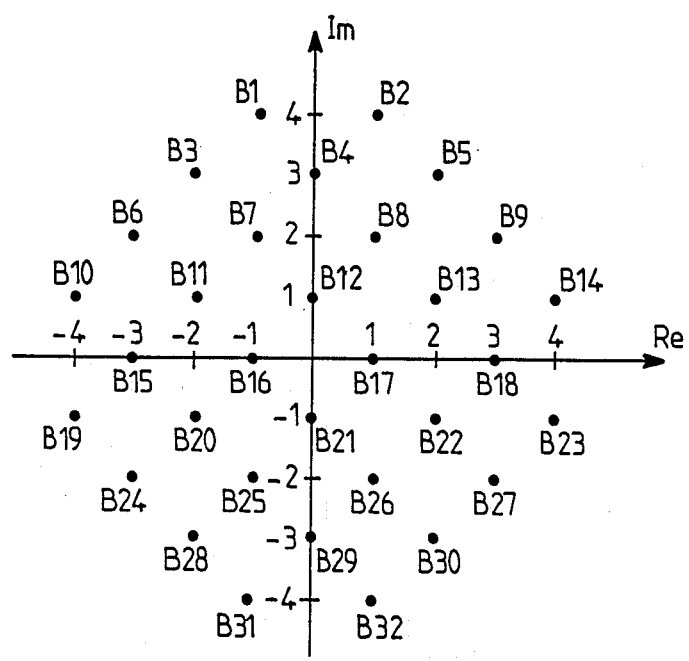

The terminal 55 receives the imaginary portion Im occurs. FIG. 3 shows how the data are situated in the complex plane. In the FIG. 3, in a, 16 points A1 ... A16 occur. Each of these points is defined by a real component Re and an imaginary component Im. These components are recalled for the points A1, A2, ... A5 in the Table I given hereinafter. In addition, a binary word which is also given in this Table I is associated with each of these points. This binary word comprises bits that have to be transmitted. In b in FIG. 3 is represented another distribution in which 32 points B1 ... B32 occur. The Table II given hereinafter relates to five first points of this last set.

TABLE I

| Points | Components | | Associated binary word |
|---|---|---|---|
| | Re | Im | |
| A1 | −3 | 3 | 1 0 1 1 |
| A2 | −1 | 3 | 1 0 0 1 |
| A3 | +1 | 3 | 1 1 1 0 |
| A4 | +3 | 3 | 1 1 1 1 |
| A5 | −3 | 1 | 1 0 1 0 |

TABLE I-continued

| Points | Components | | Associated binary word |
|---|---|---|---|
| | Re | Im | |
| . | | | |

TABLE II

| Points | Components | | Associated binary word |
|---|---|---|---|
| | Re | Im | |
| B1 | −1 | 4 | 1 1 1 1 1 |
| B2 | +1 | 4 | 1 1 0 0 0 |
| B3 | −2 | 3 | 0 1 0 0 0 |
| B4 | 0 | 3 | 0 0 1 0 1 |
| B5 | +2 | 3 | 0 1 0 1 0 |
| . | | | |

The amplitudes of these components Re and Im encoded into a digital form are applied to a first operand input EA of a complex signal multiplier 58. The second operand input EB receives a carrier signal P which can be described as:

$$P=P_o \exp(j\omega_c t)$$

$$P=P_o \cos\omega_c t + jP_o \sin\omega_c t$$

where
$P_o$ represents the amplitude,
$\omega_c$, the angular frequency of this carrier signal (for example $2\pi.1800$ rd/s)
t, the time, and
j is such that $j^2=-1$.

At the output SR of the modulator 58 appear the real part DR(n) and the imaginary part DI(n) of the data to be transmitted.

The output SR of the multiplier 58 is connected to the input of the echo canceller 50. Before being transmitted, the data DR(n) and DI(n) are filtered by two digital low-pass filters 60 and 62 respectively, the filter 60 being dedicated to the real component of the number at the output SR and the filter 62 to its imaginary component.

An adder 64 performs the summing of the numbers supplied by the filters 60 and 62. A digital-to-analog converter 66 forms the signal effectively transmitted to the terminal 7 via the coupling circuit 6. The coupling circuit 6 is also connected to the receive path 4. A sample-and-hold circuit 70 supplies analog samples of the received signal coming from the coupling circuit 6. Each of the samples passes through a subtractor for analog signals 72 so as to be cleared from the echo signal reconstituted by the canceller 50. A low-pass filter 73 eliminates the discontinuities of the sample signal that appears at the output of subtractor 72. The signal e1(n) at the output of the filter 73 is used for restoring transmitted data of which the real part appears at the terminal 74 and the imaginary part at the terminal 75. Therefore, the signal e1(n) is first applied to a variable gain amplifier 77; then the output signal of the amplifier 77 is converted into a digital signal by means of an analog-to-digital converter 78. This digital signal from the converter 78 is applied to the gain control of the amplifier 77 and also to the input of a Hilbert transformer 79 which then forms the imaginary component of this digital signal. Thus, a demodulator 80 receiving this imaginary component and the real component coming from the converter 78 applies the data signals to the terminals 74 and 75 as a function of a carrier signal. This demodulator 80, in the form of a complex number multiplier, performs the reverse operation of that of the multiplier 58 by multiplying by the signal $P_o \exp(j\omega_c t)$ the real and imaginary components mentioned last according to the rules of complex multiplication.

For adjusting the echo canceller 50 a signal e2(n) is derived from the signal e1(n) and is transformed into a digital signal e3(n) by means of an analog-to-digital converter 82.

It should be observed that the converters 78 and 82 operate at the rate of the received data and the transmitted data.

The echo canceller 50, in this described embodiment, is constituted by two sections 90 and 92. Section 90 cancels the fixed phase echo signal, that is to say, the one that does not have a variable phase and which is due to the hybrid junction 10 (FIG. 1) and section 92 cancels the echo signal which has a variable phase and is due to the remote hybrid junction 11.

Section 90 is constituted by a transversal filter whereas section 92 comprises, in addition to a transversal part, a phase shifting circuit 95 constituted by a complex number multiplier. The transversal filters of the sections 90 and 92 employ the same delay line 100, whose function is to store a specific number of consecutive data supplied at the output SR of the modulator 58 and appearing in time periods T. Since the echo to be cancelled by the section 90 is due to a near obstacle, the storing time will be much shorter than that used for section 92. Around this delay line 100 the section 90 comprises a first weighting bank 150 which multiplies different data represented by their real parts DR(n), DR(n-1) ... DR(n-nf) and their imaginary parts DI(n), DI(n-1) ... DI(n-nF), by a first series of coefficients a-0, a-1, ... a-n formed by a first calculating unit 152. A first adder 155 adds up all the results supplied by the bank 150 so as to apply at its output a replica of the estimated fixed phase echo signal.

In the same manner section 92 comprises a second weighting bank 160 which multiplies different data represented by their real parts DR(n-K), DR(n-K-1), ... DR(n-K-nV) and their imaginary parts DI(n-K), DI(n-K-1), ... DI(n-K-nV), by a second series of coefficients c-0, c-1, ... c-nv formed by a second calculating unit 162. A second adder 165 adds up the results supplied by the bank 160 so as to apply them to phase shifting circuit 95. An adder 200 adds up the fixed and variable-phase replicas of the echo signals appearing at the outputs of the first adder 155 comprised in the section 90 and of the phase shifting circuit 95 comprised in the section 92. These replicas added up by the adder 200 are converted by the converter 74 to suppress the variable phase and fixed phase echo signals. To determine the phase shift to be introduced into the output signal of the second adder 165, a phase-shift estimating circuit 220 is provided which is constituted by a phase estimating unit 222 and a transcoding unit 224 which supplies, on the basis of the phase angle $\phi(n)$ formed by the unit 222, the quantities $\cos\phi(n)$ and $\sin\phi(n)$ necessary for the operation of the phase shifting circuit 95.

In order to improve the operation of such an echo canceller, the invention recommends the following measures.

A first measure consists of providing a suppressing circuit 300 for suppressing the d.c. component of the signal e2(n).

A second measure, for the phase estimating unit 222 of the type operating on phase deviations $\Delta\phi(n)$, consists of providing an integrating circuit 310 for these phase deviations.

A third measure consists of providing an automatic gain control circuit constituted by a variable gain amplifier 320 which is inserted between the input of the analog-to-digital converter 82 and the output of the filter 73 and whose gain generally depends on the difference signal and specifically on the signal e3(n).

It should be noted that the applicants are well aware of the fact that these measures provided initially for section 92 would also be advantageous for section 90, so that the invention provides a particularly fast efficient echo canceller, for cancelling both the fixed-phase echo signal and the variable-phase echo signal. The error signal used for the sections 90 and 92 is the signal e3(n) available at the output of the suppressing circuit 300 for suppressing the d.c. component preferably operating in response to digital signals supplied by the converter 82. This signal is applied to the error signal inputs 330 and 332 of the sections 90 and 92 respectively.

Now the echo canceller according to the invention and shown in FIG. 2 will be described in greater detail.

Figure 4:
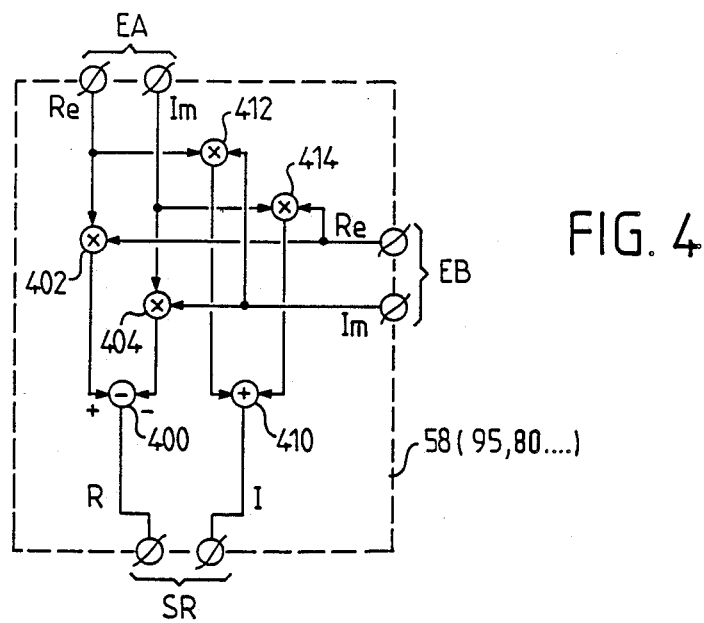
FIG. 4 shows a detailed diagram of a multiplier for complex numbers used in the canceller according to the invention.

In the first place the structure of a complex signal multiplier 58 is discussed in detail. It will be evident that the other complex-number multipliers used in the invention have the same structure. FIG. 4 is referred to. The real part of the product at the output SR of the multiplier 58 appears at the output of a subtractor 400 which comprises an (+) input for receiving the product from a multiplier 402 and an (−) input for receiving the product from a multiplier 404. The multiplier 402 establishes the product of real components of the numbers present at the input EA and EB. The multiplier 404 establishes the product of the imaginary components of the numbers at the inputs EA and EB. The imaginary part of the product at the output SR appears at the output of an adder 410 which comprises two inputs for receiving the products from the two multipliers 412 and 414. The multiplier 412 establishes a product of the real component of the signal at the input EA and the imaginary component of the signal at the input EB. The multiplier 414 determines the product of the real component of the signal at input EB and the imaginary component of the signal at input EA.

Figure 5:
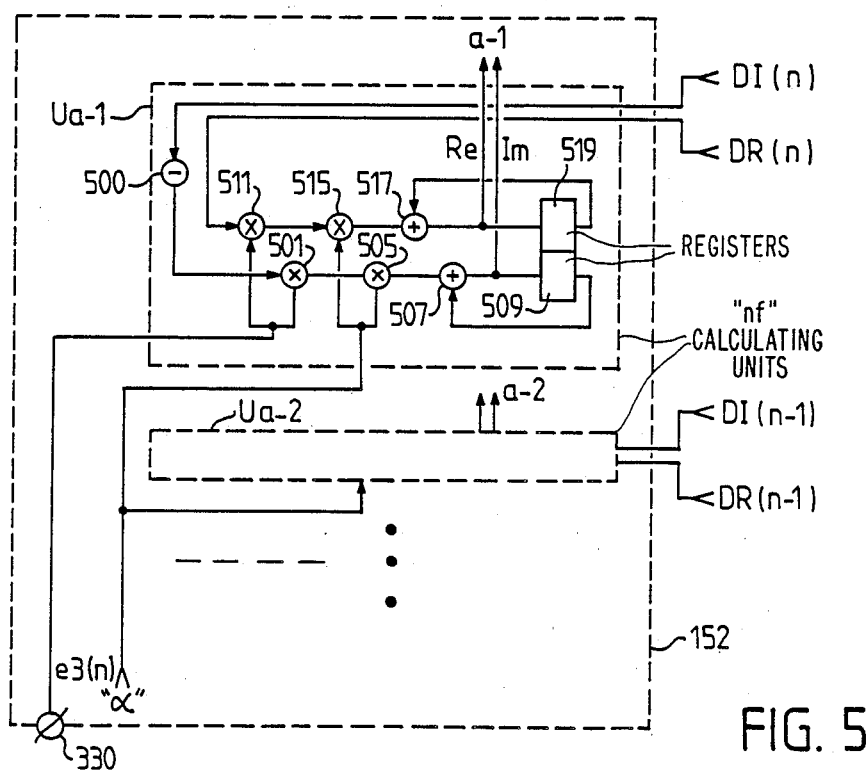
FIG. 5 shows a detailed diagram of the coefficient calculating unit of the fixed phase echo canceller.

FIG. 5 shows a detailed diagram of an embodiment of the calculating unit 152. This unit comprises "nf" calculating units Ua-1 to Ua-nf each of which determining one of the values of the coefficients a-1 to a-nf. In FIG. 5, only unit Ua-1 is represented in detail, the structure of the other units being identical therewith. To calculate a-1, the data DR(n), and DI(n), which occur at the input of the delay line 100, are necessary. To calculate a-2, the data DR(n-1) and DI(n-1), which are delayed by a time period T relative to the data DR(n) and DI(n), are necessary and so on for the "nf+1" coefficients. The data DI(n) is sign-inverted by an inverter 500, in accordance with algorithms which will be explained in the sequel, then this imaginary part DI(n) is multiplied by means of a multiplier 501 by the error signal e3(n) applied to its input 330 and the product is again multiplied, by means of a multiplier 505, by a constant "α". Then, to supply the imaginary part of a-1, the result of the multiplication effected by 505 is added by an adder 507 to a previous result contained in a register 509. The real part DR(n) is multiplied by the value e3(n) by means of a multiplier 511, again multiplied by the value "α" by means of a multiplier 515 and added by an adder 517 to a previous result contained in a register 519 coupled with register 509. The real part of a-1 is provided by the result of the adder 517.

Figure 6:
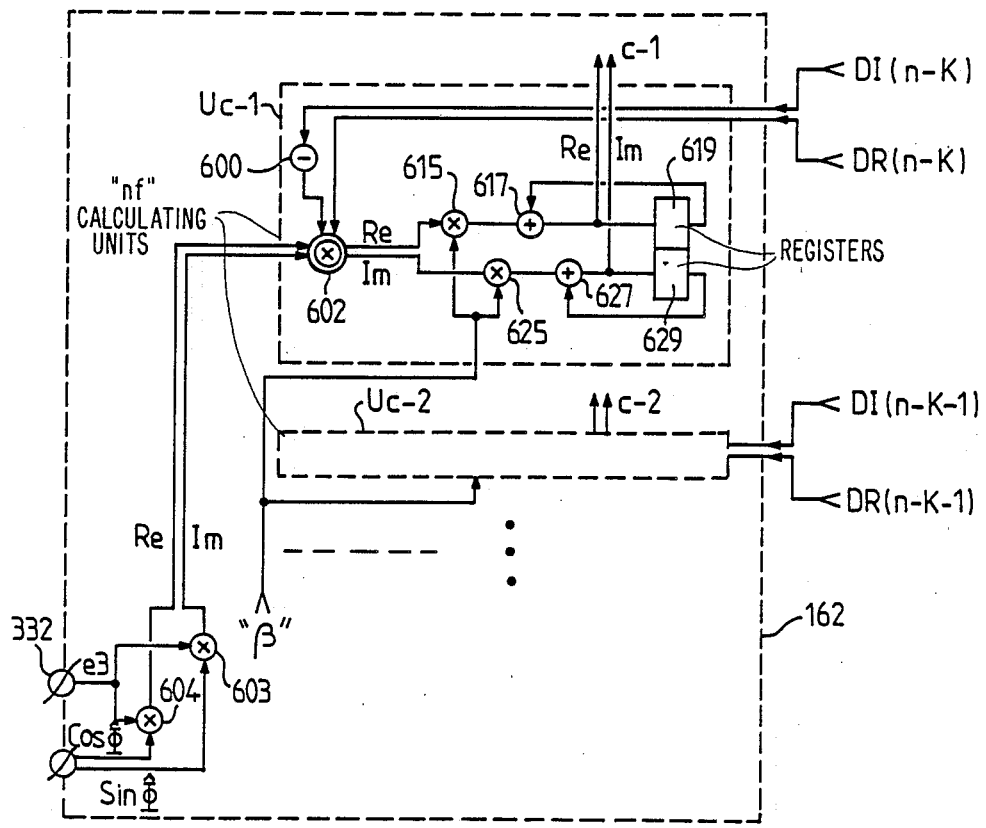
FIG. 6 shows a detailed diagram of a coefficient calculating unit of the variable phase echo canceller.

The structure of the unit 162 is shown in FIG. 6. This element comprises "nv" calculating units Uc-1 to Uc-nv having identical structures, each of which determining one of the values of the coefficients c-1 to c-nv. In FIG. 6 only unit Uc-1 is represented in detail. For calculating c-1 use is made of the data DI(n-K) and DR(n-K) which have been delayed by a time period KT comparable to the delay of the echo which one wishes to cancel. For calculating c-2 the data DI(n-K-1) and DR(n-K-1) are used, which are delayed by a time period T relative to DI(n-K) and DR(n-K) and so on for the "nV-1" other coefficients.

The data DI(n-K) is first sign-inverted by the inverter 600. The complex number formed by the real part DR(n-K) and the imaginary part considered at the output of the inverter 600, that is-(DI(n-K)), is multiplied by means of a complex number multiplier 602 with a complex number of which the imaginary part comes from a multiplier 603 and the real part from a multiplier 604. The multipliers 603 and 604 multiply the signal e3 applied to the terminal 332 by, respectively, the sine and the cosine of the phase shifting angle provided by the transcoding unit 224. The real part of the result provided by the complex member multiplier 602 is multiplied, by means of a multiplier 615, with a constant "$\beta$", after which the result is added by means of an adder 617 to the real part of the value of a previous coefficient contained in a register 619. In the same way the imaginary part of the product effected by the multiplier 602 is multiplied, by means of a multiplier 625, with the constant "$\beta$". The result of 625 is added by means of adder 627 to the imaginary part of the value c-1 contained in the register 629 coupled with register 619. The real part of the coefficient c-1 is tapped at the output of the adder 617 and its imaginary part at the output of the adder 627.

The suppressing circuit 300 for suppressing the d.c. component is formed in the first place by a subtractor 650 connected to the output of the converter 82. The quantity at the output of the converter 82 is multiplied by means of a multiplier 652 by a quantity "p" such that $p << 1$. The result furnished by this multiplier is applied to an input of an adder 654 whose other input receives the product from a multiplier 656 which multiplies by "1-p" the number at the output of a delay element 658 connected to the output of the element 654 and provided for causing a delay T. The number at the output of element 654 is applied to the (—) input of the subtractor 650 so as to thus remove the d.c. component of the signal applied to the (+) input coming from the converter 82.

Figure 7:
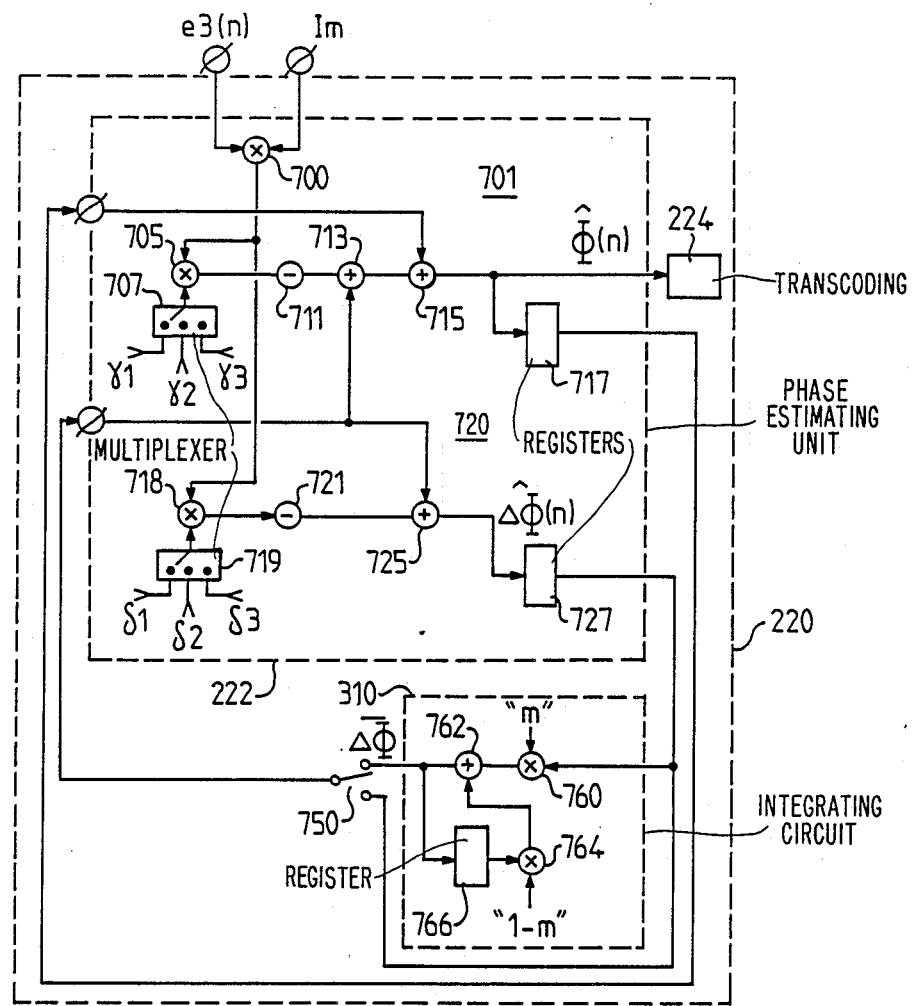
FIG. 7 shows a detailed diagram of the realization of the phase estimating unit.

In FIG. 7 the phase shift estimating circuit 220 is represented in detail. This circuit is formed, in the first place, by a phase estimating unit 222 which comprises inputs for receiving the difference signal e3(n) and also the imaginary part of the result of the operation performed by the multiplier 95. These two quantities are multiplied by each other by a multiplier 700 from which the product is used by two calculating branches 701 and 702 relating to the phase $\phi(n)$ and its variation $\Delta\phi(n)$ respectively.

The result of the operation of the multiplier 700 is applied in the branch 701 to a multiplier 705 so as to be multiplied by one of the numbers $\gamma 1$, $\gamma 2$, $\gamma 3$ originating from a multiplexer 707. The result of the mutiplier 705 is then inverted by means of an inverter 711. An adder 713 effects the addition of the number at the output of the inverter 711 to a number from the branch 702. An adder 715 adds the number at the output of the adder 713 to the previous phase $\phi(n-1)$ contained in a register 717 provided for storing the output result of this adder 715. The transcoding element 224 effects, by means of code conversion, the operations $\cos\phi(n)$ and $\sin\phi(n)$ on the basis of the phase $\hat{\phi}(n)$ estimated at the output of 715.

The result of the operation effected by the multiplier 700 is also applied in the branch 702 to a multiplier 718 so as to be multiplied by one of the numbers $\delta 1$, $\delta 2$ and $\delta 3$ originating from a multiplexer 719. Then, the result of the multiplier 718 is inverted by an inverter 721. An adder 725 adds the number at the output of the inverter 721 to the previous phase shift which is either $\Delta\hat{\phi}(n-1)$ contained in a register 727 provided for storing the output result of the adder, or $\Delta\overline{\phi}$ from the integrating circuit 310. This choice is determined by the position of a switch 750.

The integrating circuit 310 is formed by a multiplier 760 for multiplying by "m" (m < 1) the phase deviation $\Delta\hat{\phi}(n-1)$ contained in the register 727. An adder 762 adds the result of this multiplier 760 to the result of a multiplier 764. This multiplier 764 multiplies by "1-m" a number contained in a register 766 provided for storing the number at the output of the adder 762. The output of the adder 762 constitutes the output of the integrating circuit 310.

Figure 8:
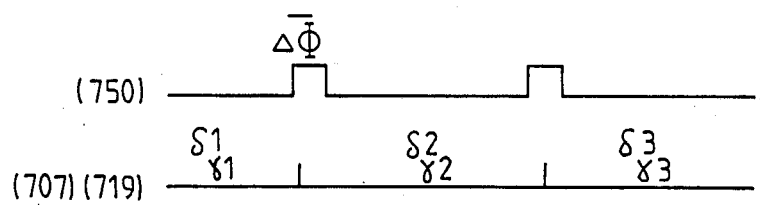
FIG. 8 shows, as a function of time, the changes of the gain values of the phase estimating unit.

FIG. 8 shows the way in which the multiplexers 707 and 719 as well as the switch 750 are operated. In this Figure it is taken into account that the quantity $\Delta\overline{\phi}$ coming from the integrating circuit 310 is used as an initial value for the estimating unit 222 when the values at the outputs of the multiplexers go from the values $\delta 1$, $\gamma 1$ to the values $\delta 2$, $\gamma 2$ and from the values $\delta 2$, $\gamma 2$ to the values $\delta 3$, $\gamma 3$.

The present invention is based on the following theoretical considerations, more specifically, with respect to the calculations effected in the section 92 (FIG. 2), the section 90 being independent.

Let us consider instant "n". At this instant the variable phase echo signal $\epsilon(n)$ at the level of the sample-and-hold circuit 70 can be written as:

$$\epsilon(n) = Re\left\{ \sum_{q=0}^{N-1} D(n-q) \cdot h(q) \cdot \exp[j\phi(n)] \right\} \quad (1)$$

When using the vectorial notation, these N samples can be considered to be the components of a vector $\vec{D}(n)$ so that:

$$D(n) = \begin{bmatrix} D(n) \\ D(n-1) \\ \cdot \\ \cdot \\ \cdot \\ D(n-N+1) \end{bmatrix}$$

The elements of the impulse response of the echo path correspond to these N samples; the vector $\vec{h}$ representing this impulse response is written as:

$$\vec{h} = \begin{bmatrix} h(0) \\ h(1) \\ \cdot \\ \cdot \\ \cdot \\ h(N-1) \end{bmatrix}$$

The transposed vector of $\vec{D}(n)$, marked $^t\vec{D}(n)$, is written as:

$$^t\vec{D}(n)=[D(n),D(n-1), D(n-N+1)].$$

Equation (1) can thus be written as:

$$\epsilon(n)=RE[^t\vec{D}(n).\vec{h}(n).\exp[j\phi(n)]] \qquad (2)$$

If $\vec{c}$ is the vector of the coefficients calculated by elements 162:

$$\vec{c} = \begin{bmatrix} c-1 \\ c-2 \\ \cdot \\ \cdot \\ \cdot \\ c-nV \end{bmatrix}$$

The estimated echo $\hat{\epsilon}(n)$ is then written as:

$$\hat{\epsilon}(n)=Re[^t\vec{D}(n).\vec{c}(n).\exp[j\hat{\phi}(n)]] \qquad (3)$$

At the output of subtractor 72, the residual signal e(n) is written as:

$$e(n)=\epsilon(n)-\hat{\epsilon}(n) \qquad (4)$$

$$e(n)=Re[^t\vec{D}(n).\{\vec{h}(n).\exp[j\phi(n)]-\vec{c}(n).\exp[j\hat{\phi}(n)]\}] \qquad (4 \text{ bis})$$

It is shown that an iterative procedure allows of minimizing e(n) (more often its mean square value) by adjusting the values $\vec{c}$ and $\hat{\phi}$.

This procedure can be formulated in the following manner by:

$$\vec{c}(n+1)=\vec{c}(n)+\beta.e(n).\vec{D}^*(n).\exp[j\hat{\phi}(n)] \qquad (5)$$

$$\hat{\phi}(k+1)=\hat{\phi}(k)-\gamma.e(n).IM\{\hat{\epsilon}(n)\}+\Delta\hat{\phi}(k) \qquad (6)$$

$$\Delta\hat{\phi}(k+1)=\Delta\hat{\phi}(k)-\delta.e(n).Im\{\hat{\epsilon}(n)\} \qquad (7)$$

where $D^*(n)=DR(n)-jDI(n)$.

It will be evident that the calculation of the phase can be effected at a faster rate than that of the coefficients which is effected at all periods T, so that, in order to show this, the letter "k" in lieu of the letter "n" has been used. The phase $\hat{\phi}(k)$ of the equation (6) is considered at the instant "k" that is closest to the instant "n".

Unit 152 effects the operation:

$$\vec{a}(n+1)=\vec{a}(n)+\alpha.e(n).\vec{D}^*(n) \qquad (8)$$

The equations (6) and (7) show that one is facing a second order phase control, so that a loop of this type is taken as a model to explain its operation. To better comprehend the following, reference is made to the article by William C. Lindsey et al., published in PROCEEDINGS OF THE I.E.E.E., Vol. 69, No. 4, Apr. 1981, pp. 410 to 431 and entitled: "A Survey of Digital Phase-Locked Loops".

If we call $e\Phi(k)$ the phase error in this loop resulting from a phase $\phi(k)$ at the input of this loop and if we call $E(Z)$ and $\Psi(Z)$ the z-transforms of $e\Phi(k)$ and $\phi(k)$, $E(Z)$ can be derived from $\Psi(Z)$, in the absence of disturbances such as noise, according to the following equation (corresponding with the equation 4–5 in the article by Lindsey).

$$E(Z)=[1-H(Z)]\Psi(Z)$$

where H(Z) represents the filtering function of the loop. The second order loop which is operated will have H(Z) as a response so that:

$$1 - H(Z) = \frac{(Z-1)^2}{(Z-A)^2 + B^2}$$

A, B being constant values.
The following difference equation is obtained:

$$e\Phi(k)-2A \cdot e\Phi(k-1)+(A^2+B^2)e\Phi(k-2)=\phi(k)-2\phi(k-1)+\phi(k-2)$$

having the following initial conditions $$e\Phi(-1)=e\Phi(-2)=0$$

The parameters A and B are linked with the natural frequencies $\omega_n$ and the damping factor $\xi$ of the second order control loops $$A=\exp(-\xi\omega_n T).\cos(\omega_n T\sqrt{1-\xi^2})$$

$$B=\exp(-\xi\omega_n T).\sin(\omega_n T\sqrt{1-\xi^2})$$

which yields for H(p), p=j$\omega$:

$$H(p) = \frac{2\xi\omega_n \cdot p + \omega^2}{p^2 + 2\xi\omega_n \cdot p + \omega_n^2}$$

To represent the behaviour of such a loop this will be simplified considering the phase control for an angular frequency change of $Q_o$rad/sec at the instant k=0, for which the initial conditions would be:

$$e\Phi(0)=0; \omega(0)=0$$

where $\omega(n)=\phi(n)-\phi(n-1)$.
The article by Lindsey indicates thus (see Table III) that the phase error $e\Phi(k)$ in these conditions is:

$$e\omega(k) = Q_0 T \frac{\sin k\mu}{B} \sqrt{A^2 + B^2}^k$$

where $\mu=\text{tg}^{-1}[B/A]$.

Corresponding to this phase error $e\Phi(k)$ is a frequency error $\Delta\omega$:

$$\Delta\omega = \frac{\partial e\Phi(k)}{\partial k} = \frac{Q_0 T}{B} \cdot \exp(-k\xi\omega_n T) \cdot$$

-continued $$\omega_n T(\sqrt{1-\xi^2} \cdot \cos k\mu - \xi \cdot \sin k\mu)$$

It should be observed that these equations certainly do not take into account the disturbances such as noise.

The first measure which the invention recommends is to eliminate any d.c. component coming from circuits off the sampler 70 and the converter 82. Actually, the applicants have taken into account that the value e(n), measured in the circuit 82, could have an erroneous sign according to a probability pb which would be expressed by:

$$pb = \frac{\Delta}{||e||}$$

where $\Delta$ is the d. c. component and $||e||$ is the mean square value of e(n).

Each error of the sign of e(n) results in a mistake in the computation of equations (5), (6) and (7).

When there is only a single linear echo signal and a single linear echo canceller, $\Delta$ can be regarded as a random noise signal, which provides that the measures necessary for obtaining a satisfactory convergence of the echo canceller can be the following:

reduce B realize a high-pass filtering. These two methods have been used in the past, the realization of the high-pass filtering being of a rather simple nature.

On the other hand, in the phase control circuits, this presence will be represented by a certain error in the control adjustment, an error which will be proportional to the d.c. component and also inversely proportional to the mean level of the echo signal.

The ratio of this d.c. component to the error signal thus occurs without the control circuit itself being able to correct. In these conditions, if one wishes to have a convergence with an amount $\Delta\omega_{max}$ of residual offset, it is required that:

$$\frac{\Delta}{||e||} < aN \cdot \Delta\omega_{max} \cdot T$$

where "a" is a proportionality factor, and

N is the number of samples used for controlling the system.

The Applicants have thus noticed that a high-pass filter whose performance is compatible (for example, 70 dB attenuation) with the constraint set forth would be complex as to its implementation and would induce additional computing load or extra circuitry.

In order to correct this offset, the arrangement thus comprises a circuit 300 allowing of adaptively correcting a d.c. component at the input of the control systems. It furnishes a quantity "Offset" intended to neutralise $\Delta$.

In order to adaptively eliminate the d.c. component, the circuit performs the following operation at the sample rate: Offset (n)=(1-p). Offset (n-1)+p.e2(n) where p is a constant value less than 1, Offset (n) is the value of the quantity "Offset" at the instant n and e2(n) is the signal at the input of the analog-to-digital converter 82. This circuit has a very simple implementation presenting a very good performance. This causes $\Delta$ to be diminished. Now it applies that $$aN\Delta\omega_{max}T||e|| > \Delta$$

as a result of which it is possible to diminish $\Delta\omega_{max}$.

On observing the maximum frequency which the control circuit can track, starting from the equations defined hereinbefore, Lindsey shows that:

$$e\Phi(k) = Q_0 T \cdot \frac{\sin k\mu}{B} \sqrt{\alpha^2 + \beta^2}^k \; ; \mu = \omega_n T \cdot \sqrt{1-\xi^2}$$

It is advisable that $e\Phi(k) < \pi$, so that the control circuit can be locked. It being given that $e\Phi(k)$ has a maximum value when $\sin(k\mu) = \sin(\pi/2) = 1$, the following value will be obtained for k:

$$k' = \frac{\pi/2}{\mu} = \frac{\pi/2}{\omega_n T \sqrt{1-\xi^2}}$$

and for this value of k' we have:

$$e\Phi(k') = \frac{Q_0 T}{B} \exp[-\pi\xi/(2\sqrt{1-\xi^2})]$$

or finally for $e\Phi(k') = \pi$:

$$\frac{B}{Q_0 T} = \frac{1}{\pi} \exp[-\pi\xi/(2\sqrt{1-\xi^2})]$$

The maximum values $Q_{omax}$ that can be corrected by the control circuit will thus be:

$$Q_{omax} = \frac{\pi B}{T} \exp[\pi\xi/(2\sqrt{1-\xi^2})]$$

As B is approximately proportional to $\omega_n$ for low values of $\omega_n T$, it is thus observed that $Q_{omax}$ is proportional to $\omega_n$, the natural frequency of the loop, that is to say, that a fine convergence ($\omega_n$ is small) passes at a small $Q_o$.

It is desirable for the value of the maximum permissible frequency shift to become higher. For this purpose, the method comprises an arrangement allowing of changing the gain of its control adjustments so as to permit a convergence at a large $Q_o$ in a first time period, then to switch, after a specific period of time at the end of which there will be a first convergence, to control constants in a second time period that permit a convergence within the limit values which are fixed according to the characteristic features of transmission. Furthermore, the arrangement allows of effecting several consecutive switching operations so as to progressively go from the desired value $Q_{omax}$ up to the value $Q_{max}$ permitting full-duplex transmission. Thus, with a large gain a frequency offset of 5 Hz can be tracked and with a small gain an offset which is better than 1/1000 Hz can be obtained.

This method allows of ensuring proper convergence of the phase control with respect to performance potentials, but it is poor if one considers the consecutive convergence durations of each of the steps between the switching operations, and consequently there is a risk that a satisfactory convergence can only be effected outside the time intervals that have been set otherwise.

Figure 9:
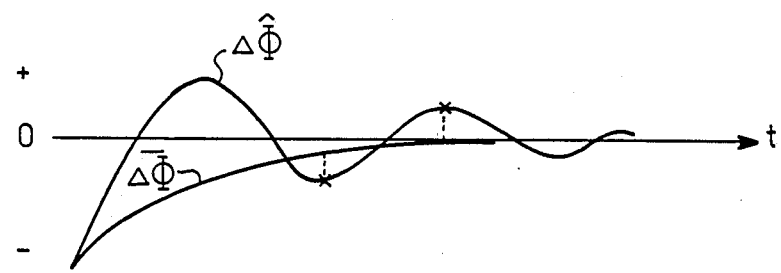
FIG. 9 shows the evolution of the phase deviation and of its integrated value.

To obviate this disadvantage, the controls are provided with non critical gains ($\zeta < 1/\sqrt{e}$), so that a faster convergence will occur around the effective value of the frequency offset. This faster convergence is nevertheless contrasted with the fact that it begins to take shape in the form of damped oscillations, having an amplitude which is higher as $\zeta$ is small. This disadvantage is represented in FIG. 9.

Thus, the invention includes a method by which the instantaneous values of the frequency offsets are integrated, over a time period which is substantially equal to the periods of an oscillation around the nominal value. Under these conditions, as the convergence speed around the offset value has been improved at the cost of the beat around this value, when one proceeds to the switching of a next convergence gain of the control, the average of the instantaneous value $\Delta\phi_k$, effected over a time period equal to one beat, will be substituted for the instantaneous value $\Delta\phi_k$, so that a convergence will be obtained which is equivalent to the convergence obtained on the basis of a critical damping, but in a much shorter time. This is shown in FIG. 9 in which can be seen that the fluctuations of $\Delta\bar{\phi}$ are more often much nearer to "0" than the fluctuations of $\Delta\phi$. Thus, when taking $\Delta\bar{\phi}$ as an initial value for the gain changes, it is ensured that the convergence time is shorter on average.

The effect of this arrangement is also that it diminishes the noise-sensitivity of the phase control circuits.

As a third improvement the invention provides a method which allows of enabling the control circuits to operate when the level of the echo signal is low, specifically if the resolution of the converters employed is restricted.

For this purpose, and according to FIG. 2, an arrangement is inserted for adaptively amplifying the residual echo signal by adjusting the gain of the amplifier 320. The effect of this amplification is essentially measured in terms of precision, during the sampling of the echo signal, for very low values. Actually, when a signal is received at a very low level, there is a certain probability that the signal is situated below the detecting threshold of the analog-to-digital converter 82 and the value supplied by this converter is equal to zero, which implies that this converter 82 does not detect any energy. As regards the operation of the echo canceller, it might suffice for ensuring a good convergence of the control circuits that this converter 82 operates as a sign detector. Thus, it is a matter of sign detection when the residual echo signal $e_R$ at the input of the analog-to-digital converter 82 has a value that is not lower than a specific minimum value $e_{min}$ so that the value supplied by the converter 82 just differs from zero. The probability that this converter 82 will not detect any energy is thus expressed by $pb(e_R < e_{min})$.

From this value $e_{min}$ an angular error $\theta$ can be derived so that the converged echo canceller and the phase control circuit do not initiate sign detection, that is to say, that $\theta$ will be the angular error of $\hat{e}(n)$ so that $e(n)$ will become slightly lower than the detection threshold of the converter 82. $\theta$ can be expressed such that - cf. equations (2), (4bis), (6) and (7):

$$\epsilon(n) = \text{Re}[^t\vec{D}(n).\vec{h}(n).\exp(j\phi(n)+j\theta)]$$

$$= \text{Re}[^t\vec{D}(n).\vec{h}(n).\exp(j\phi(n))]$$

at the output of the converter 82. $\theta$ is thus a function of the precision of the converter and of the level of the echo signal, from which:

$$e(n) = \epsilon(n) - \hat{\epsilon}(n)$$

$$= \text{Re}[^t\vec{D}(n).\{\vec{h}(n).\exp(j\phi(n)+j\theta) - \vec{c}(n).\exp(j\hat{\phi}(n)))\}]$$

and, at the end of the convergence, if the linear section of the echo canceller has converged correctly, that is to say, if:

$$\vec{h}(n) = \vec{c}(n), \ e(n) = 0$$

for n = N, where N is the number of samples during the whole period of convergence, we can derive from the previous equation for e(n) that:

$$\hat{\phi}(N) = \phi(n) + \theta$$

Admitting of a certain approximation, we may evaluate an angular error per period T having a value $\theta/N$ so that $$\Delta\hat{\phi}(N) = \Delta\phi(N) + \theta/N.$$

Corresponding with this error $\theta/N$ is a frequency error $\theta/(NT)$. From this it is derived that, for obtaining a satisfactory convergence, it is advisable to obtain:

$$\theta/(NT) < \Delta\omega_{max}$$

Thus it is noted that the way of reducing $\Delta\omega_{max}$ without penalizing the convergence time (NT) is reducing $\theta$, that is to say, the probability $pb(e_R < e_{min})$ that the converter 82 will not detect any energy.

When $e_R$ is small, the presence of the adaptive gain allows of reducing $e_{min}$ proportionally to the applied gain, thus reducing $\Delta\omega_{max}$ at the end of the convergence.

We claim:

1. An echo canceller for cancelling a variable phase echo signal, comprising:
    (a) means for connecting the echo canceller between first and second one-way signal paths, one of the first and second signal paths being a send path and the other of the first and second signal paths being a receive path,
    (b) phase shifting means,
    (c) an adaptive filter, cooperating with the phase shifting means, for forming a replica of the echo signal,
    (d) a subtractor inserted in the receive path for supplying a difference signal between the echo signal and the replica of the echo signal,
    (e) a suppressing circuit for suppressing the d.c. component of the difference signal, which suppressing circuit supplies an adjusting quantity for use by the adaptive filter and the phase shifting means and which suppressing circuit operates by means of adaptive computation,
    (f) a phase estimating means for forming at an instant t+1, a phase value $\phi(t+1)$ on the basis of a previous value $\phi(t)$ and a phase deviation $\Delta\phi(t)$, and
    (g) an integrating circuit, within the phase shifting means, for effecting an integration $\Delta\phi(t)$ of the phase deviation $\Delta\phi(t)$.

2. An echo canceller for cancelling a variable-phase echo signal as claimed in claim 1 further comprising:
    (a) an analog-to-digital converter inserted in the receive path and having an output signal, transmitted data being supplied to a user based on the output signal of the analog-to-digital converter, and (b) an automatic gain control circuit formed by a variable gain amplifier having an output at the input of the analog-to-digital converter and whose gain depends on the difference signal.

3. An echo canceller for cancelling a variable-phase echo signal as claimed in claim 2, characterized in that the d.c. component suppressing circuit suppresses the d.c. component by means of an offset signal so that:
Offset(t)=(1−p).Offset(t−1)+p.e(n) where p is a constant value less than 1 (p<<1), e(n) is the difference signal, Offset(t) is the value of the signal obtained at instant t, and Offset(t−1) is the previous value of the d.c. component of this signal.

4. An echo canceller for cancelling a variable-phase echo signal as claimed in claim 3, characterized in that the integrating circuit performs the following operation:

$$\overline{\Delta\phi}(t)=m.\Delta\phi(t-1)+(1-m).\overline{\Delta\phi}(t-1)$$

where
m is a constant value less than 1 (m<1),
$\overline{\Delta\phi}(t)$: the value of the integrated phase deviation at instant t,
$\Delta\phi(t-1)$: the previous value of the phase deviation,
$\overline{\Delta\phi}(t-1)$: the previous value of the integrated phase deviation.

5. An echo canceller for cancelling a variable phase echo signal as claimed in claim 4 comprising
(a) a phase estimating unit including
(i) means for performing the following operations:

$$\hat{\phi}(t+1)=\hat{\phi}(t)-\gamma.f(e,\hat{\epsilon})+\Delta\hat{\phi}(t)$$

$$\Delta\hat{\phi}(t+1)+\Delta\hat{\phi}(t)-\delta.f'(e,\hat{\epsilon})$$

where $f(e,\hat{\epsilon})$ and $f'(e,\hat{\epsilon})$ are functions of the difference signal e and the replica of the echo signal $\hat{\epsilon}$,
(ii) a plurality of switches for changing the values $\gamma$ and $\delta$, and
(iii) a circuit for applying the value $\Delta\phi(t)$ in lieu of $\Delta\phi(t)$ when the switches change the values $\gamma$ and $\delta$.

6. An echo canceller for cancelling a variable-phase echo signal as claimed in claim 1, characterized in that the d.c. component suppressing circuit suppresses the d.c. component by means of an offset signal so that:
Offset (t)=(1−p). Offset (t−1)+p.e(n) where p is a constant value less than 1 (p<<1), e(n) is the difference signal, Offeset (t) is the value of the signal obtained at instant t, and Offset(t−1) is the previous value of the d.c. component of this signal.

7. An echo canceller for cancelling a variable-phase echo signal as claimed in claim 6, characterized in that the integrating circuit performs the following operation:

$$\overline{\Delta\phi}(t)=m.\Delta\hat{\phi}(t-1)+(1-m).\overline{\Delta\phi}(t-1)$$

where
m is a constant value less than 1 (m<1),
$\overline{\Delta\phi}(t)$: the value of the integrated phase deviation at instant t,
$\Delta\hat{\phi}(t-1)$: the previous value of the phase deviation,
$\overline{\Delta\phi}(t-1)$: the previous value of the integrated phase deviation.

8. An echo canceller for cancelling a variable phase echo signal as claimed in claim 7 comprising (a) a phase estimating unit including
(i) means for performing the following operations:

$$\hat{\phi}(t+1)=\hat{\phi}(t)-\gamma.f(e,\hat{\epsilon})+\Delta\hat{\phi}(t)$$

where $f(e,\hat{\epsilon})$ and $f'(e,\hat{\epsilon})$ are functions of the difference signal e and the replica of the echo signal $\hat{\epsilon}$, and
(ii) a plurality of switches for changing the values $\gamma$ and $\delta$, and
(iii) a circuit for applying the value $\Delta\phi(t)$ in lieu of $\overline{\Delta\phi}(t)$ when the switches change the values $\gamma$ and $\delta$.

9. An echo canceller for cancelling a variable-phase echo signal as claimed in claim 1, characterized in that the integrating circuit performs the following operation:

$$\overline{\Delta\phi}(t)=\text{i } m.\Delta\hat{\phi}(t-1)+(1-m).\overline{\Delta\phi}(t-1)$$

where
m is a constant value less than 1 (m<1),
$\overline{\Delta\phi}(t)$: the value of the integrated phase deviation at instant t,
$\Delta\hat{\phi}(t-1)$: the previous value of the phase deviation, $\overline{\Delta\phi}(t-1)$: the previous value of the integrated phase deviation.

10. An echo canceller for cancelling a variable phase echo signal as claimed in claim 9 comprising
(a) a phase estimating unit including
(i) means for performing the following operations:

$$\phi(t+1)=\phi(t)-\gamma.f(e,\epsilon)+\Delta\phi(t)$$

where $f(e,\epsilon)$ and $f'(e,\epsilon)$ are functions of the difference signal e and the replica of the echo signal $\epsilon$,
(ii) a plurality of switches for changing the values $\gamma$ and $\delta$, and
(iii) a circuit for applying the value $\Delta\phi(t)$ in lieu of $\Delta\phi(t)$ when the switches change the values $\gamma$ and $\delta$.

11. An echo canceller for cancelling a variable phase echo signal as claimed in claim 1 comprising
(a) a phase estimating unit including
(i) means for performing the following operations:

$$\hat{\phi}(t+1)=\hat{\phi}(t)-\gamma.f(e,\hat{\epsilon})\Delta\hat{\phi}(t)$$

$$\Delta\phi(t+1)=\Delta\phi(t)-\delta.f'(e,\epsilon)$$

where $f(e,\hat{\epsilon})$ and $f'(e,\hat{\epsilon})$ are functions of the difference signal e and the replica of the echo signal $\hat{\epsilon}$,
(ii) a plurality of switches for changing the values $\gamma$ and $\delta$, and
(iii) a circuit for applying the value $\overline{\Delta\phi}(t)$ in lieu of $\Delta\hat{\phi}(t)$ when the switches change the values $\gamma$ and $\delta$.

12. An echo canceller for cancelling a variable phase echo signal as claimed in claim 1, characterized in that it comprises a fixed-phase echo cancelling section adjusted on the basis of the difference signal.

13. An echo canceller for cancelling a variable phase echo signal, comprising:
(a) means for connecting the echo canceller between first and second one-way signal paths, one of the first and second signals paths being a send path and the other of the first and second signal paths being a receive path, (b) phase shifting means,
(c) an adaptive filter, cooperating with the phase shifting means, for forming a replica of the echo signal,
(d) a subtractor inserted in the receive path for supplying a difference signal between the echo signal and the replica of the echo signal,
(e) a suppressing circuit for suppressing the d.c. component of the difference signal, which suppressing circuit supplies an adjusting quantity for use by the adaptive filter and the phase shifting means and which suppressing circuit operates by means of adaptive computation,
(f) an analog-to-digital converter inserted in the receive path and having an output signal, transmitted data being supplied to a user based on the output signal of the analog-to-digital converter, and
(g) an automatic gain control circuit formed by a variable gain amplifier having an output at the input of the analog-to-digital converter and whose gain depends on the difference signal.

14. An echo canceller for cancelling a variable phase echo signal, comprising:
(a) means for connecting the echo canceller between first and second one-way signal paths, one of the first and second signal paths being a send path and the other of the first and second signal paths being a receive path,
(b) phase shifting means,
(c) an adaptive filter, cooperating with the phase shifting means, for forming a replica of the echo signal,
(d) a subtractor inserted in the receive path for supplying a difference signal between the echo signal and the replica of the echo signal, and
(e) a suppressing circuit for suppressing the d.c. component of the difference signal, which suppressing circuit supplies an adjusting quantity for use by the adaptive filter and the phase shifting means and which suppressing circuit suppresses the d.c. component by means of an offset signal so that:

$$\text{Offset}(t) = (1-p) \cdot \text{Offset}(t-1) + p \cdot e(n)$$

where p is a constant value less than 1 ($p \ll 1$), $e(n)$ is the difference signal, Offset(t) is the value of the signal obtained at instant t, and Offset(t−1) is the previous value of the d.c. component of this signal.

15. An echo canceller for cancelling a variable phase echo signal, comprising:
(a) means for connecting the echo canceller between first and second one-way signal paths, one of the first and second signal paths being a send path and the other of the first and second signal paths being a receive path,
(b) phase shifting means,
(c) an adaptive filter, cooperating with the phase shifting means, for forming a replica of the echo signal,
(d) a subtractor inserted in the receive path for supplying a difference signal between the echo signal and the replica of the echo signal,
(e) a suppressing circuit for suppressing the d.c. component of the difference signal, which suppressing circuit supplies an adjusting quantity for use by the adaptive filter and the phase shifting means and which suppressing circuit operates by means of adaptive computation, and
(f) a phase estimating unit including
  (i) means for performing the following operations:

$$\hat{\phi}(t+1) = \hat{\phi}(t) - \gamma \cdot f(e, \hat{\epsilon}) + \Delta\hat{\phi}(t)$$

$$\Delta\hat{\phi}(t+1) = \Delta\hat{\phi}(t) - \delta \cdot f'(e, \hat{\epsilon})$$

where $f(e,\epsilon)$ and $f'(e,\epsilon)$ are functions of the difference signal e and the replica of the echo signal $\epsilon$,
  (ii) a plurality of switches for changing the values $\gamma$ and $\delta$, and
  (iii) a circuit for applying the value $\overline{\Delta\hat{\phi}(t)}$ in lieu of $\Delta\hat{\phi}(t)$ when the switches change the values $\gamma$ and $\delta$.

* * * * *